(12) United States Patent
Otsuka et al.

(10) Patent No.: US 7,619,745 B2
(45) Date of Patent: Nov. 17, 2009

(54) OPTICAL ENCODER INCLUDING APERTURE WITH DIFFUSION ELEMENT AND COLLIMATOR LENS

(75) Inventors: Takanori Otsuka, Utsunomiya (JP); Kazuhiko Kodama, Utsunomiya (JP)

(73) Assignee: Mitutoyo Corporation, Kawasaki-shi (JP)

( * ) Notice: Subject to any disclaimer, the term of this patent is extended or adjusted under 35 U.S.C. 154(b) by 194 days.

(21) Appl. No.: 11/822,402

(22) Filed: Jul. 5, 2007

(65) Prior Publication Data

US 2008/0024797 A1  Jan. 31, 2008

(30) Foreign Application Priority Data

Jul. 28, 2006  (JP) ............... 2006-206195

(51) Int. Cl.
G01B 11/02 (2006.01)
G01B 9/02 (2006.01)
G01D 5/36 (2006.01)
G01N 21/86 (2006.01)
G01V 8/00 (2006.01)

(52) U.S. Cl. .................. 356/499; 356/521; 250/237 G; 250/559.29

(58) Field of Classification Search .......... 356/488, 356/494, 499, 512, 521; 250/237 G, 559.16–559.18, 250/559.29
See application file for complete search history.

(56) References Cited

U.S. PATENT DOCUMENTS

| | | | | |
|---|---|---|---|---|
| 3,957,377 A | * | 5/1976 | Hutchinson | 356/141.4 |
| 4,577,101 A | * | 3/1986 | Bremer et al. | 250/231.16 |
| 4,889,780 A | * | 12/1989 | Cosner | 430/1 |
| 4,923,771 A | * | 5/1990 | Cosner | 430/1 |
| 4,952,058 A | * | 8/1990 | Noguchi et al. | 356/237.5 |
| 5,101,279 A | * | 3/1992 | Kurematsu et al. | 349/95 |
| 5,102,227 A | * | 4/1992 | Zwirner et al. | 356/638 |
| 6,429,937 B2 | * | 8/2002 | Ishikawa | 356/445 |
| 7,227,124 B2 | * | 6/2007 | Altendorf | 250/231.13 |
| 2001/0019413 A1 | * | 9/2001 | Ishikawa et al. | 356/445 |
| 2001/0021021 A1 | * | 9/2001 | Ishikawa | 356/445 |
| 2001/0021022 A1 | * | 9/2001 | Ishikawa | 356/445 |
| 2001/0021023 A1 | * | 9/2001 | Ishikawa | 356/445 |
| 2001/0022693 A1 | * | 9/2001 | Ishikawa | 359/642 |
| 2002/0196416 A1 | * | 12/2002 | Shiraishi | 355/53 |
| 2003/0026002 A1 | * | 2/2003 | Lopez-Hernandez et al. | 359/641 |
| 2003/0160966 A1 | * | 8/2003 | Osaki et al. | 356/499 |
| 2005/0219546 A1 | * | 10/2005 | Otsuka | 356/499 |
| 2006/0097141 A1 | * | 5/2006 | Kiriyama et al. | 250/231.13 |
| 2006/0284062 A1 | * | 12/2006 | Altendorf | 250/231.13 |

(Continued)

FOREIGN PATENT DOCUMENTS

DE  3420600 A1  12/1984

(Continued)

*Primary Examiner*—Patrick J Connolly
(74) *Attorney, Agent, or Firm*—Oliff & Berridge, PLC

(57) ABSTRACT

An optical encoder which is designed to convert light generated from a light source into parallel light rays by using a collimator lens, thereby allowing the collimated light to radiate to gratings (a first grating, a second grating and a third grating). A diffusing element (a diffusion plate or a diffusion surface) is provided between the light source and the collimator lens to mitigate the parallelization degree of light, thereby weakening the second-order and the third-order or high-order diffraction light. Consequently, even where a light emitting diode (LED) or laser diode (LD) is used as the light source, a favorable interference output can be obtained.

3 Claims, 5 Drawing Sheets

| U.S. PATENT DOCUMENTS | | | | |
|---|---|---|---|---|
| 2007/0002452 A1* | 1/2007 | Munro | | 359/627 |
| 2009/0016052 A1* | 1/2009 | Holder et al. | | 362/240 |

FOREIGN PATENT DOCUMENTS

| EP | 1 574 826 A1 | 9/2005 |
|---|---|---|
| EP | 1 657 528 A1 | 5/2006 |
| JP | A 2003-279383 | 10/2003 |
| JP | A 2005-257521 | 9/2005 |

\* cited by examiner

OPTICAL ENCODER INCLUDING APERTURE WITH DIFFUSION ELEMENT AND COLLIMATOR LENS

CROSS-REFERENCE TO RELATED APPLICATION

The disclosure of Japanese Patent Application No. 2006-206195 filed on Jul. 28, 2006 including specifications, drawings and claims is incorporated herein by reference in its entirety.

BACKGROUND OF THE INVENTION

1. Field of the Invention

The present invention relates to an optical encoder which is designed to convert light generated from a light source into parallel light rays by using a collimator lens, thereby allowing the collimated light to radiate to a grating and also to the collimator lens therefor. In particular, the present invention relates to an optical encoder capable of obtaining a favorable interference output appropriately used in optical encoders such as a linear encoder, a linear gauge and an arc-shaped encoder (a rotary encoder) employing point light sources such as a light emitting diode (LED) and a laser diode (LD) used as a light source, and also to a collimator lens therefor.

2. Description of Related Art

As shown in FIG. 1, as optical encoders used in a linear encoder, a linear gauge, an arc-shaped encoder (a rotary encoder) or the like, known is a 3-grating reflective-type encoder which is provided with a light source portion 12 including a light source 14 disposed inside a detector 10 and a collimator lens 16 for converting light generated from the light source 14 into parallel light rays, a first grating 22 for diffracting light radiated from the collimator lens 16 disposed on a transparent substrate 20 inside the detector 10, a second grating 32 formed on a scale 30 which relatively moves the detector 10 toward a measurement axis direction, a third grating 26 disposed on the transparent substrate 20 which further diffracts light diffracted by the first grating 22 and the second grating 32 disposed inside the detector 10, and a light receiving portion 24 including a light receiving element 28 which receives light diffracted by the first to the third gratings 22, 32, 26 (refer to Japanese Published Unexamined Patent Application No. 2003-279383 (Patent Document 1)).

In recent years, a light-generating source used as the light source 14 has become small in size and close to an ideal point-light source, interference becomes excessively intense, and as shown in FIG. 2, not only ±first-order or low-order diffraction light but also ±second-order and ±third-order or high-diffraction lights are also entered, therefore, as shown in FIG. 3, a favorable interference output cannot be obtained, which is a problem. In the drawing, G denotes a gap between the first and the third gratings 22, 26 and the second grating 32.

As an invention similar to the present invention, the applicant proposed in Japanese Published Unexamined Patent Application No. 2005-257521 (Patent Document 2) (especially FIGS. 1, 12, 13) that a diffusion plate is provided between the collimator lens 16 and the first grating 22, and/or a light diffusion portion is provided on the surface of the light source 14. The diffusion plate and the light diffusion portion are for giving a greater tolerance to deviation from the design value of gap G to improve alignment properties and not for obtaining a favorable interference output by preventing the second or the third high-diffraction light.

SUMMARY OF THE INVENTION

The present invention has been made for solving the above-described conventional problem, an object of which is to mitigate the parallelization degree of light which enters a grating, thereby preventing second-order and third-order or high-order diffraction lights to provide a favorable interference output.

The present invention is an optical encoder which is designed to convert light generated from a light source into parallel light rays by using a collimator lens, thus radiating the light on a grating in which a diffusion means is provided between the light source and the collimator lens to mitigate the parallelization degree of light, thereby solving the above problem.

The diffusion means may be provided on an aperture for preventing stray light.

Further, the aperture and the diffusion means may be made integrated and a part of the aperture may be used as the diffusion means.

Further, the diffusion means may be provided on the surface of the collimator lens.

Further, the surface of the collimator lens may be used as a diffusion surface.

Further, the collimator lens may be accommodated into a case having an aperture.

Still further, the grating may be made available as a 3-grating type which includes a first grating for diffracting light radiated from the collimator lens, a second grating formed on a scale and a third grating for further diffracting the light diffracted by the first and the second gratings.

In addition, the scale may be made available as a reflective type and the first grating and the third grating may respectively be provided on the same side of the scale.

The present invention is also to provide a collimator lens for optical encoder, at least a part of the surface of which is given as a diffusion surface.

The collimator lens for optical encoder may be accommodated into a case at which an aperture is formed.

According to the present invention, the parallelization degree of light which enters a grating is mitigated, and the second-order and the third-order or high-order diffraction light are weakened, by which a favorable interference output can be obtained by ±first low diffraction light. It is, therefore, possible to measure the displacement with high accuracy.

These and other novel features and advantages of the present invention will become apparent from the following detailed description of the preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

A detailed description will be hereinafter made for embodiments of the present invention with reference to drawings.

Figure 1:
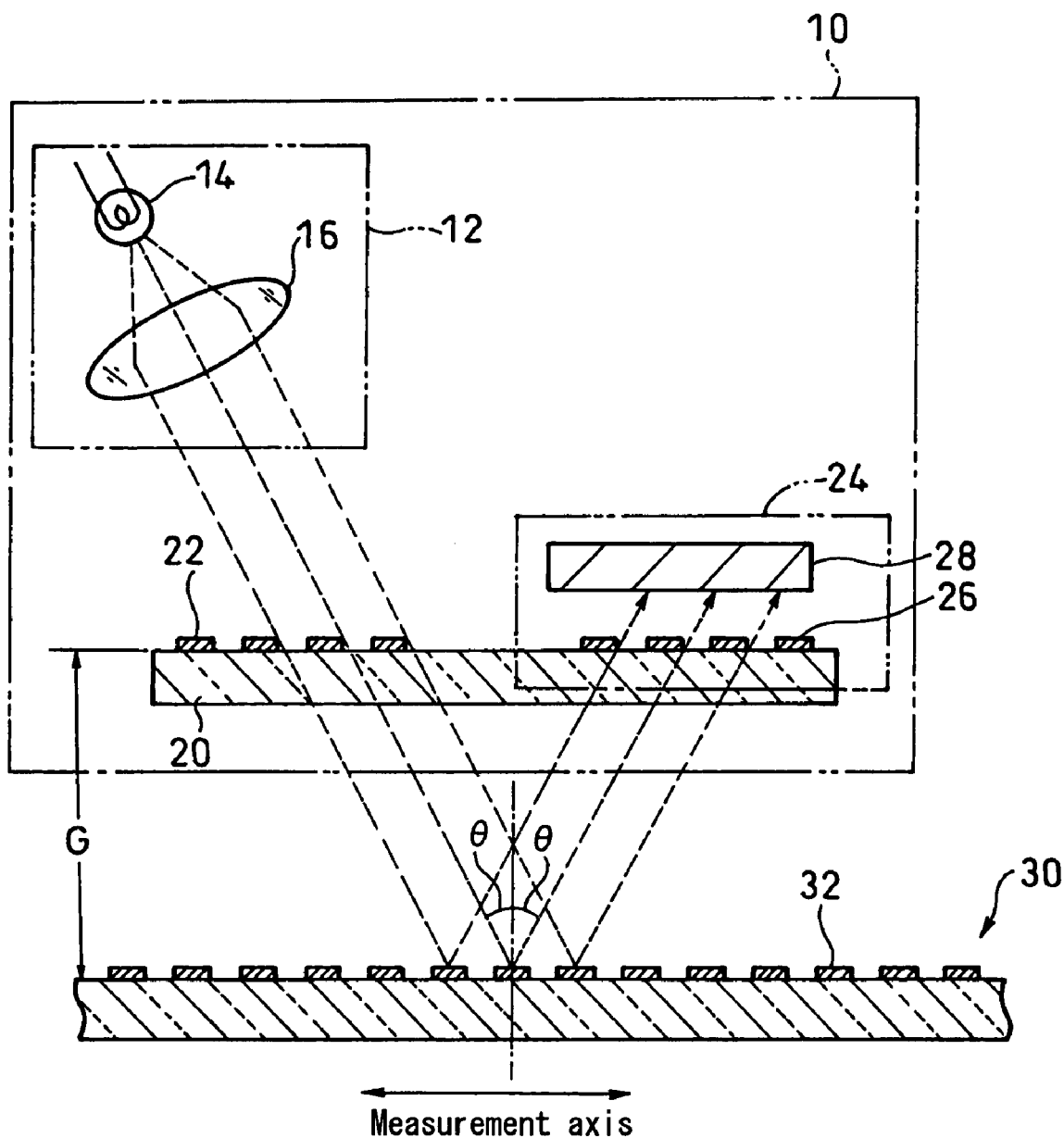
FIG. 1 is a sectional view showing a basic constitution of a 3-grating reflective-type optical encoder.
Figure 2:
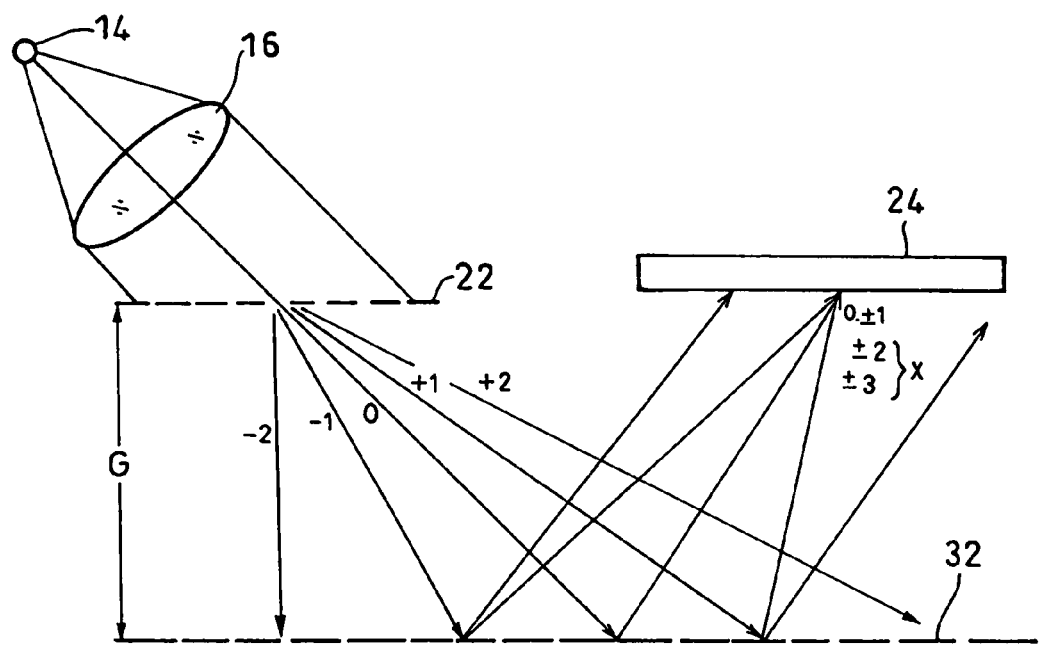
FIG. 2 is a ray diagram for explaining a conventional problem.
Figure 3:
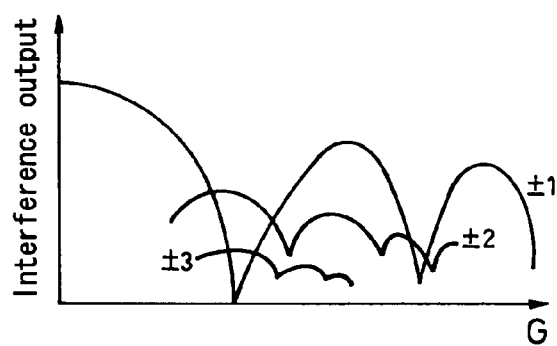
FIG. 3 is also a diagram showing interference outputs.
Figure 4:
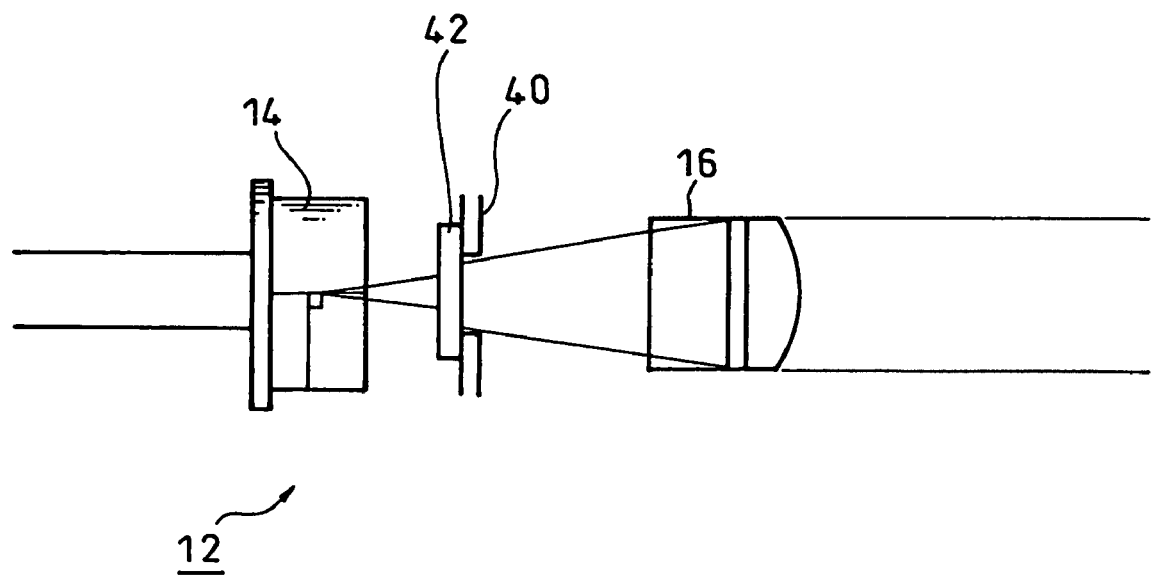
FIG. 4 is a sectional view showing major parts of Embodiment 1 of the present invention.

As shown in FIG. 4, in Embodiment 1 of the present invention, an aperture 40 for preventing stray light is provided between the light source 14 of the light source portion 12 and the collimator lens 16, wherein the aperture 40 is provided with a diffusion plate 42.

According to the present embodiment, it is possible to prevent the stray light and mitigate the parallelization degree at the same time.

Figure 5:
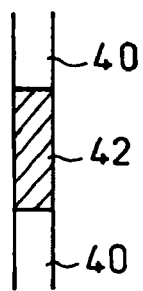
FIG. 5 is also a sectional view showing major parts of Embodiment 2.

Next, a detailed description will be made for Embodiment 2 of the present invention with reference to FIG. 5.

In the present embodiment, an aperture 40 and a diffusion plate 42 are made integrated and a part of the aperture 40 is used as the diffusion plate 42.

According to the present embodiment, the constitution is quite simple.

Figure 6:
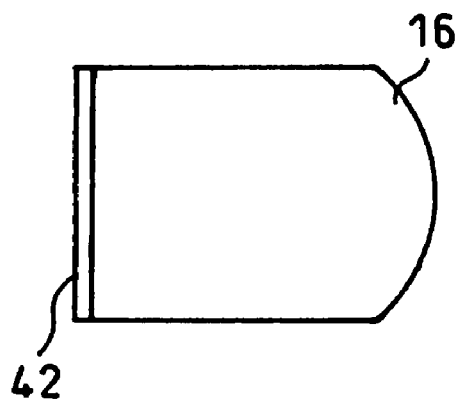
FIG. 6 is also a sectional view showing major parts of Embodiment 3.

Next, a detailed description will be made for Embodiment 3 of the present invention with reference to FIG. 6.

In the present embodiment, a diffusion plate 42 is provided on the surface of a light source 14 of a collimator lens 16.

According to the present embodiment, it is not necessary to separately provide the diffusion plate 42. The surface on the light source 14 side of the collimator lens 16 itself may be given as a rough surface and also made as a diffusion surface without the diffusion plate. Further, the surface on the grating side of the collimator lens 16 itself may be made as a diffusion surface.

Figure 7:
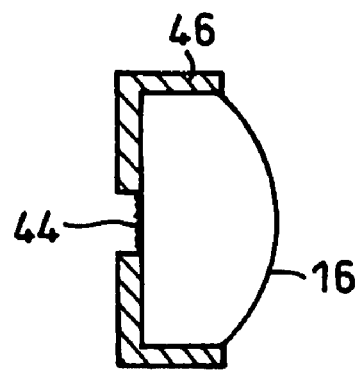
FIG. 7 is also a sectional view showing major parts of Embodiment 4.

Next, a detailed description will be made for Embodiment 4 of the present invention with reference to FIG. 7.

In the present embodiment, the surface on the light source 14 side of the collimator lens 16 itself is given as a rough surface and made as a diffusion surface 44 and also accommodated into a case 46 having an aperture.

According to the present embodiment, it is not necessary for separately providing an aperture or a diffusion plate and, therefore, the constitution is quite simple.

Figure 8:
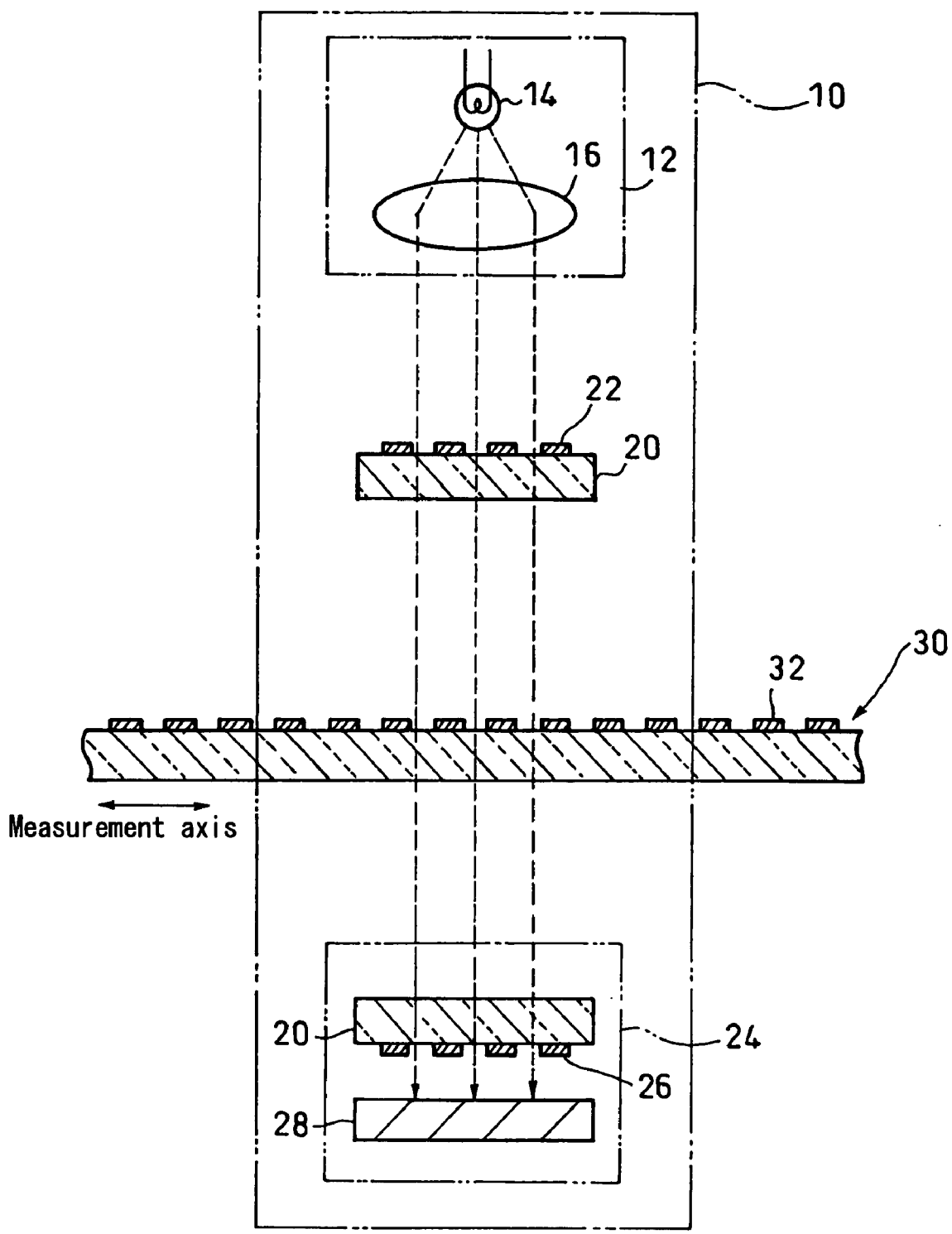
FIG. 8 is a sectional view showing a basic configuration of a 3-grating transmission-type optical encoder to which the present invention is applicable.

In any of the embodiments described above, the present invention is applied to a reflective-type optical encoder. The present invention is not restricted thereto but may be similarly applicable to a transmission-type optical encoder using a transmission-type scale, as the basic constitution illustrated in FIG. 8.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

What is claimed is:

1. An optical encoder which is designed to convert light generated from a light source into parallel light rays by using a collimator lens, thereby allowing the collimated light to radiate to a grating, wherein a plate having an aperture for preventing stray light is provided between the light source and the collimator lens, a diffusion element is integrally provided on the plate, and the aperture is used as a diffusing portion to mitigate the parallelization degree of light.

2. The optical encoder according to claim 1, wherein the grating is a 3-lattice type which includes a first grating for diffracting light radiated from the collimator lens, a second grating formed on a scale and a third grating for further diffracting light diffracted by the first grating and the second grating.

3. The optical encoder according to claim 2, wherein the scale is a reflective type, and the first grating and the third grating are respectively provided on the same side of the scale.

* * * * *